United States Patent [19]
Copley

[11] Patent Number: 5,367,539
[45] Date of Patent: Nov. 22, 1994

[54] DIGITAL BLOCK PROCESSOR FOR PROCESSING A PLURALITY OF TRANSMISSION CHANNELS IN A WIRELESS RADIOTELEPHONY SYSTEM

[75] Inventor: Terry W. Copley, Township of Harding, Morris County, N.J.

[73] Assignee: AT&T Bell Laboratories, Murray Hill, N.J.

[21] Appl. No.: 815,683

[22] Filed: Dec. 31, 1991

[51] Int. Cl.⁵ .................. H04B 7/10; G06F 15/332
[52] U.S. Cl. ......................... 375/100; 364/726; 455/33.1; 455/33.3
[58] Field of Search .............. 375/38, 40, 55, 87, 375/100, 102; 379/58, 63; 364/726; 455/33.1, 33.2, 33.3, 66

[56] References Cited

U.S. PATENT DOCUMENTS

| | | | |
|---|---|---|---|
| 4,501,149 | 2/1985 | Konno et al. | 364/726 |
| 4,528,656 | 7/1985 | Morais | 370/30 |
| 4,559,605 | 12/1985 | Norsworthy | 364/726 |
| 4,601,005 | 7/1986 | Kilvington | 364/726 |
| 4,698,769 | 10/1987 | McPherson et al. | 364/726 |
| 4,958,361 | 9/1990 | Rosen et al. | 375/102 |
| 5,023,902 | 6/1991 | Anderson et al. | 379/59 |

FOREIGN PATENT DOCUMENTS 0146652 3/1985 European Pat. Off.
8604762 8/1986 European Pat. Off.

OTHER PUBLICATIONS

"TDM/FDM Translation as an Application of Digital Signal Processing" by Stanley L. Freeny IEEE 1980, p. 5.

Primary Examiner—Stephen Chin
Assistant Examiner—Young Tse
Attorney, Agent, or Firm—Alfred G. Steinmetz

[57] ABSTRACT

A digital block receiver system, in a cellular/wireless FM radiotelephony system, receives and heterodyne a block of cellular/wireless receive channels to a very low block IF signal by analog processing. This block IF signal is applied to a precision high speed A/D converter and converted to a digitized time series. A window function is applied to the digitized time series and a high speed FFT is applied to frequency isolate the individual channels. The active channels are digitally processed by a DSP to recover the FM channel modulation.

23 Claims, 16 Drawing Sheets

FIG. 14

| N | ADD & SUB | | MULTIPLY | | DIVIDE | |
|---|---|---|---|---|---|---|
| | GEN | SPEC | GEN | SPEC | GEN | SPEC |
| 2 | 6 | 4 | 6 | 4 | 1 | 1 |
| 3 | 10 | 6 | 9 | 6 | 1 | 1 |
| 4 | 14 | 14 | 12 | 8 | 1 | 1 |
| 5 | 18 | 14 | 15 | 10 | 1 | 1 |
| 6 | 22 | 28 | 18 | 12 | 1 | 1 |
| 7 | 26 | 24 | 21 | 14 | 1 | 1 |

5,367,539

DIGITAL BLOCK PROCESSOR FOR PROCESSING A PLURALITY OF TRANSMISSION CHANNELS IN A WIRELESS RADIOTELEPHONY SYSTEM

FIELD OF THE INVENTION

This invention relates to wireless telecommunication systems having a plurality of communication channels each having a single FM carrier at a separate frequency dedicated to that channel. It is particularly concerned with the reverse link radio transceiver of such a wireless telecommunication system located at a stationary signal radiation site.

BACKGROUND OF THE INVENTION

Presently the reverse link signal processors of a wireless telephone communication system such as a cell site or a microcell require a separate radio transceiver for each transmission channel in service. In a cell site serving up to 30 channels, 30 individual transceivers are required. These transceivers, designated radio channel units (RCUs), are individually expensive and represent a major portion of the cell site or microcell cost. Common equipment serving a plurality of channels at RF levels may be shared to reduce cost, but separate receiving equipment is required at the IF level for each channel.

SUMMARY OF THE INVENTION

A digital block receiver system, in a cellular/wireless FM radiotelephony system, receives and heterodynes a block of cellular/wireless receive channels to a very low IF by analog processing. This block IF signal is applied to a precision high speed A/D converter and converted to a digitized time series. A window function is applied to the digitized time series and a high speed FFT is applied to frequency isolate the individual channels. The active channels are processed by a digital signal processor to recover the FM channel modulation.

In particular applications telecommunication channels may encompass analog FM voice signals; analog FM supervisory tones; analog FM signalling tones; and digital FSK data messages. These channels may, in accord with the principles of the invention all be processed as a block.

A computationally efficient method of separating and demodulating the signals of the processed block signal uses the power spectra obtained from the Fourier transform output coefficients to recover the frequency modulated carrier of each channel.

In accordance with the invention the instantaneous FM carrier frequency is determined by computing the first moment of the Fourier transform power spectrum associated with each channel to be recovered. A power masking operation may be optionally applied and individual spectra that significantly exceed the mask are assumed to be excessively noise contaminated and are rejected for purposes of the recovery operation. The first moment calculation is repeated without the excessively noisy spectra to achieve an improved estimation of the of the instantaneous FM carrier frequency.

BRIEF DESCRIPTION OF THE DRAWING

In the Drawing:

FIG. 14 is a tabulation showing a first moment computational efficiency between a special case symmetrical analysis versus a general case analysis;

DETAILED DESCRIPTION

Figure 1:
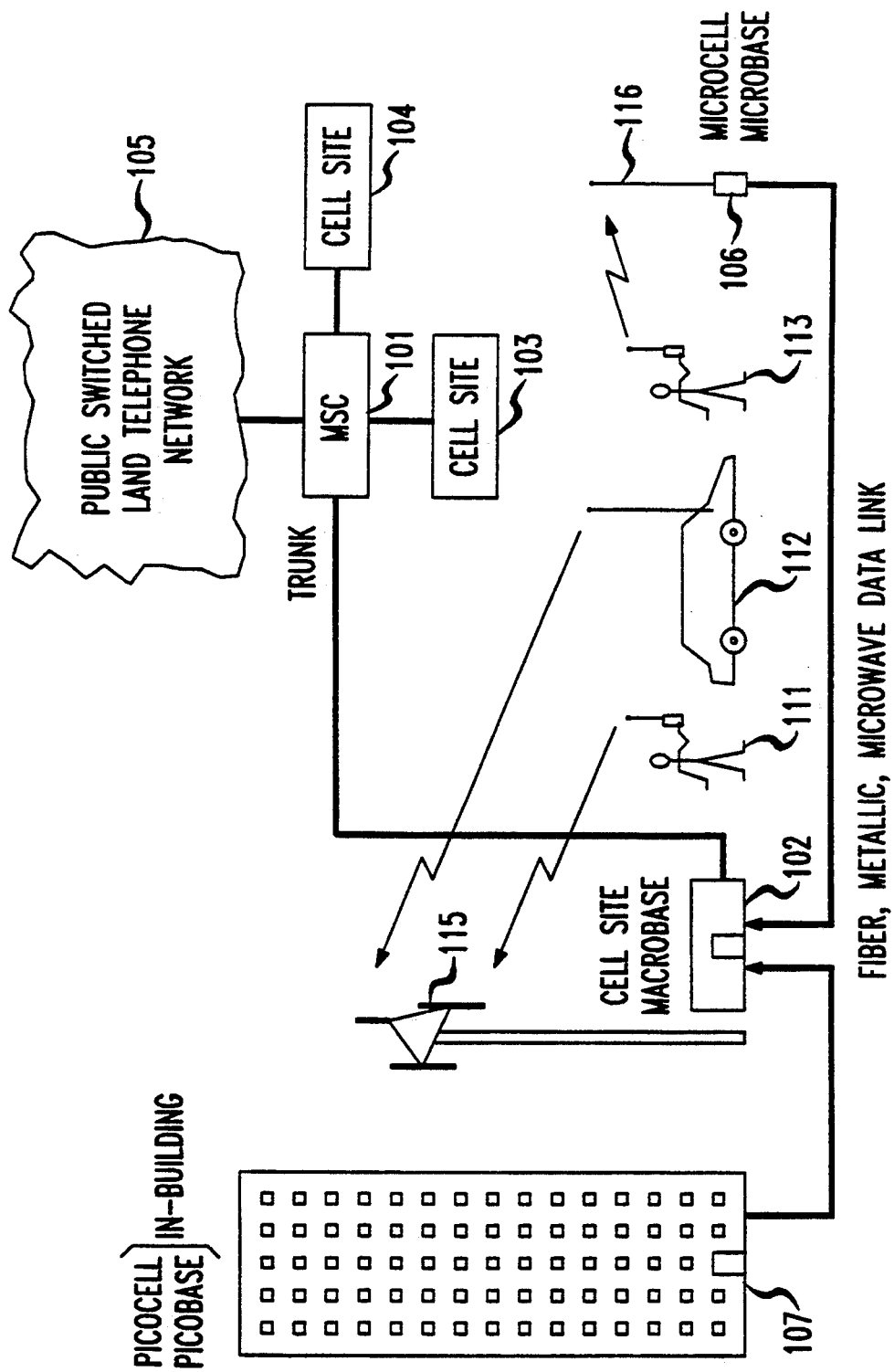
FIG. 1 is a block schematic of a illustrative wireless communication system embodying the principles of the invention.

An illustrative wireless telephone system is shown in the FIG. 1. A mobile switching center 101 (MSC) is connected, via a trunk or microwave link, to three cell sites 102, 103 and 104. It interconnects these cell sites 102–104 to a public switched land telephone network 105. Each cell site 102–104 services a defined geographical service area. The illustrative cell site 102 is connected to a microcell 106 located within its service area and a picocell (an in building wireless system) serving a building 107 within the service area. These connections may be implemented using fiber optics, metallic wire, point-to-point microwave links or a combination of these connections.

The cell site 102 serves as a macrobase station which provides telephone service to personal communication devices of pedestrians 111 and mobile radio telephone service to mobile vehicles 112 within its service area. In addition it serves as a control center servicing the picocell of building 107 and microcell 106 (serving the pedestrian 113) and interconnecting them to the MSC 101.

Each of the macrocells 102–104, microcells and picocells includes one or more antenna for transmitting and receiving radio signals. Antenna 115 serves the macrobase 102. Micro cell 106 has the antenna 116. The picocell includes in-building antennas (not shown). Voice and data signals are received by one or more of these antennas as one or more RF block signals. Some receive channels may be dedicated to voice or to data or in the general case a channel may handle both voice and data signals.

Figure 2:
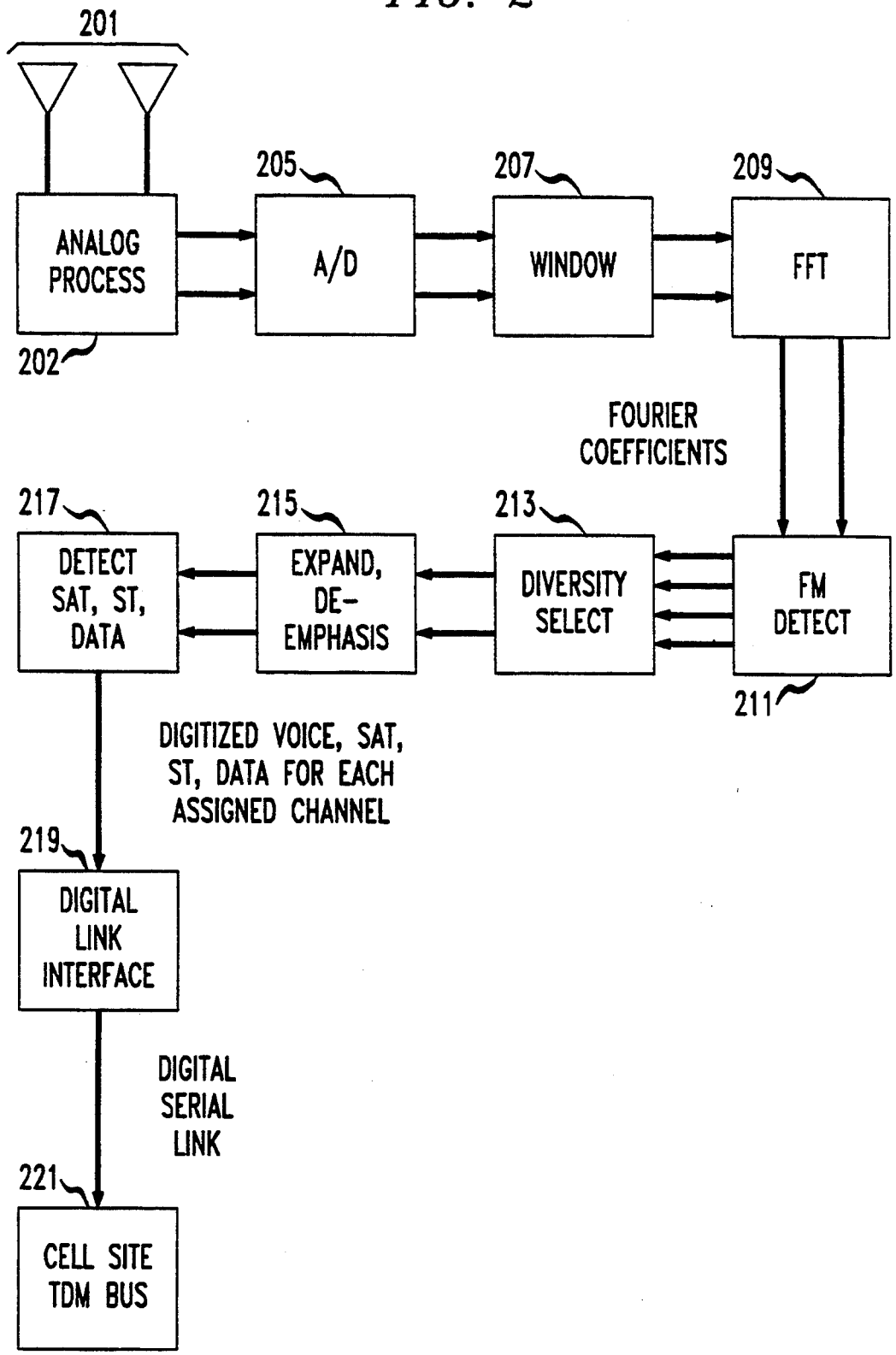
FIG. 2 is a block schematic of an illustrative FM digital block receiver embodying the principles of the invention.

An analog FM digital block receiver, receiving the reverse link transmission of one of the cell service areas of FIG. 1, is shown in FIG. 2. Such a radio receiver may be located at the central cell control site, microcell location or the picocell location for providing wide area, local area and in-building service. The reverse link signals are intercepted by one or more antennas 201 connected to the relevant receiving site and applied to an analog processing circuit 202. The analog processing circuit 202 is operative to amplify and filter the received block of channel signals and heterodyne the block signal to a low intermediate frequency (IF). The low IF is important to limit the required Nyquist sampling rate used by the subsequent Analog-to-Digital converter 205. The analog circuitry of the block receiver must be highly linear to prevent intermodulation products within the block signal that are strong enough to limit the dynamic range of the receiver to an undesirable low level. The lower edge frequency of the IF block signal must be sufficiently high to avoid the folding of low frequency signal energy into the IF block signal and thereby limit the receiver's dynamic range.

The Analog-to-Digital converter 205 converts the IF block signal into a digital form comprising a digitized time series. A single Analog-to-Digital converter is required for each receive diversity path when real demodulation is used. In the event that complex demodulation is used, two Analog-to-Digital converters are required for each diversity path. The Analog-to-Digital converter 205 must have sufficient accuracy to avoid the generation of excessive quantizing noise and intermodulation products that would limit the dynamic range of the block receiver. The sampling rate must have a sufficiently high frequency to satisfy the Nyquist sampling criteria for the highest frequency included in the IF block signal.

Figure 3:
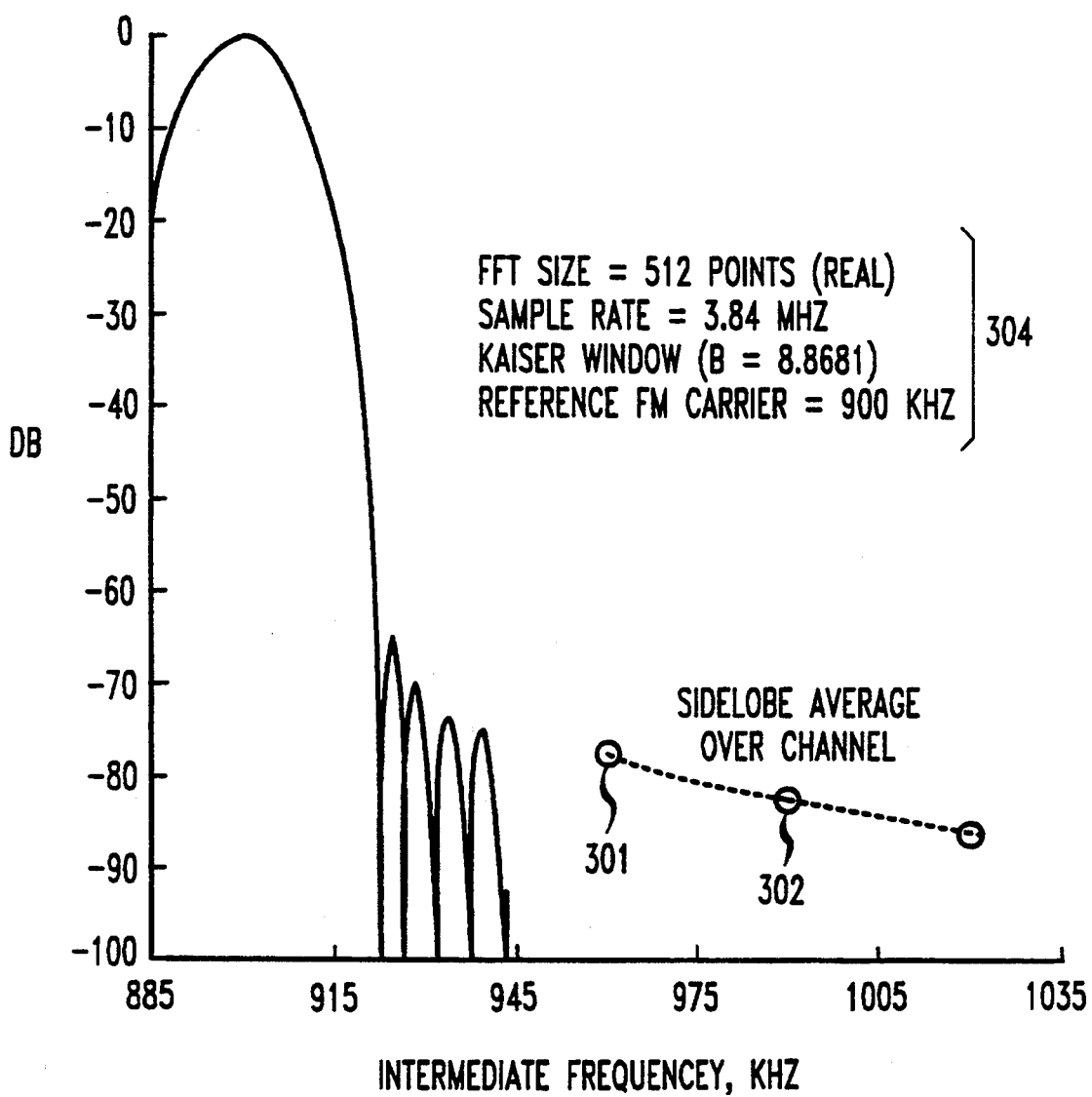
FIG. 3 is a graph of the adjacent channel frequency selectivity of an unmodulated FM carrier signal such as is processed by the receiver of FIG. 2.

The digitized time series output of the Analog-to-Digital converter 205 is applied to a window function processor 207 to improve selectively between the individual channels in the IF block signal and to enhance FM detection performance. In selecting window criteria the effect of a strong signal in one channel interfering with a weak signal in an adjacent or nearby channel must be considered. An example of such a situation, providing acceptable performance, is shown in the graph of FIG. 3. In FIG. 3 with the measurement conditions 304, an unmodulated FM carrier at an IF of 900 KHz is shown having a leakage signal 301 averaged over a channel centered at 960 KHz that is 78 dB down from the 900 KHz signal. For a channel centered at 990 KHz, the leakage signal 302 is down 81 db.

The windowed signals are applied to a fast Fourier transform (FFT) processor 209. The FFT 209 processes the windowed signals to isolate in frequency the individual channels within the received IF block signal. The derived FFT parameters are optimized in size (points), span (time) and execution rate to enhance FM detection by the FM detector apparatus 211.

The FM detection apparatus 211 is illustratively a stored program controlled processor such as a DSP (digital signal processor). It is programmed to recover the FM modulating signal from the FFT output power spectra derived from the IF block signal. FM detection is based on the fact that the first moment of the FFT power spectra associated with a particular channel provides a highly accurate estimate of the FM carrier instantaneous frequency for that channel, under modulation and measurement conditions to be specified herein below and explained with reference to the flow graph of FIG. 16. Because the instantaneous frequency is directly proportional to the amplitude of the modulating waveform, the result is a highly accurate FM detection process.

Calculation of the first moment is performed, in response to stored control instructions, or by hardwired logic circuitry, for all channels of interest that are included in the IF block signal. Calculation of the FFT is periodically executed over successive windows of the receiver block predetection digitized time series, and a post detection baseband time series for each channel of interest is thereby produced.

Several conditions must be satisfied to achieve a highly accurate and sensitive FM detection process. First, in order to achieve an acceptable degree of post detection linearity and voice band amplitude flatness, detection conditions are selected that provide an effective time span of the window preceding the FFT apparatus that is less than $\frac{1}{4}$ cycle of the highest baseband modulating frequency present that produces peak deviation conditions. Here the effective time span is the window width at which 50% of the window weighting is obtained.

Second, the window that precedes the FFT apparatus also must exhibit frequency domain sidelobes that are lower than the minimum acceptable post detection signal-to-noise ratio.

Third, in order to further obtain acceptable uncompensated linearity in the detected signal the first moment calculation must incorporate power spectra that are offset, relative to the channel center frequency, by an amount at least equal to the sum of the peak frequency deviation and the highest modulating frequency present that produces peak deviation conditions.

Fourth, in order to obtain a highly sensitive FM detection process, the first moment calculation must exclude power spectra that are offset, relative to the channel center frequency, by an amount that exceeds the sum of the peak frequency deviation and the highest modulating frequency present that produces peak deviation conditions. For enhanced sensitivity the first moment calculation must in addition dynamically reject those power spectra that are excessively distorted by noise.

Figure 4:
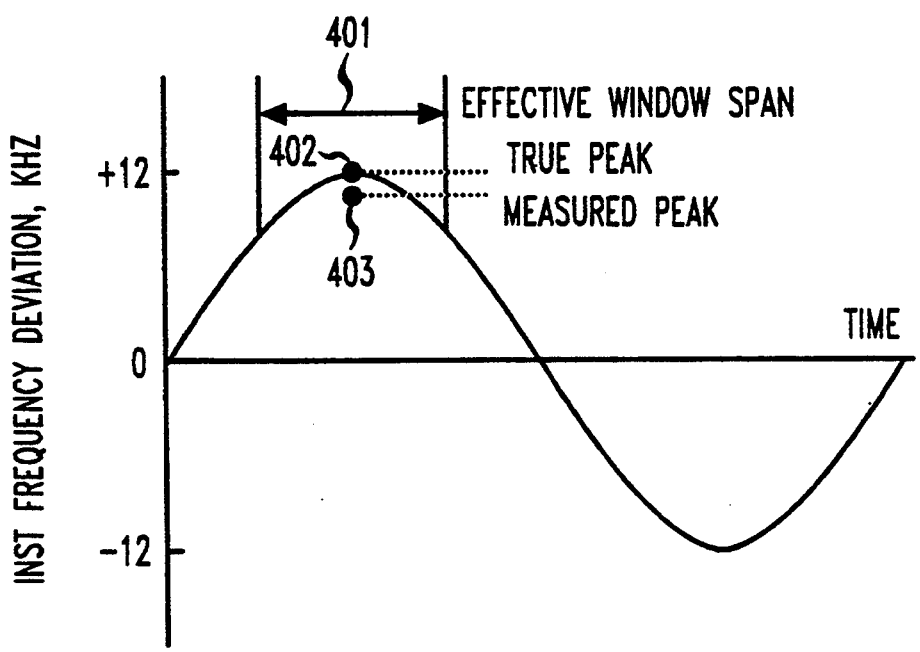
FIG. 4 is a graph illustrating a performance criterion of the FM detection system.

The first of the above conditions, defining the window effective time span, places an upper bound on the highest baseband modulation frequency present that produces peak deviation conditions. For the existing North American Analog FM FDMA mobile telephone standard (herein after designated STANDARD) this frequency is 3 KHz (maximum voice band frequency). The rationale for this first condition is graphically shown in the FIG. 4 which defines the effective window time span 401 and the true and measured peak value 402 and 403 of a modulating sinewave. In the calculation of the first moment, the instantaneous frequency of the FM carrier is observed through the time window. If this instantaneous frequency varies during the window span the first moment calculation is an approximation of the average instantaneous frequency. As shown in FIG. 4, if the effective window 401 is centered at a time corresponding to the true peak 402 of the waveform, the instantaneous frequency (ordinate point) estimated will be less than the true frequency and a non-linearity will occur. This compressive effect is symmetrical in both time and instantaneous frequency deviation and therefore produces odd harmonics of the illustrative sine wave shown. The ¼ cycle criterion establishes a threshold which if exceeded would cause a rapid reduction in FM detection linearity.

Figure 5:
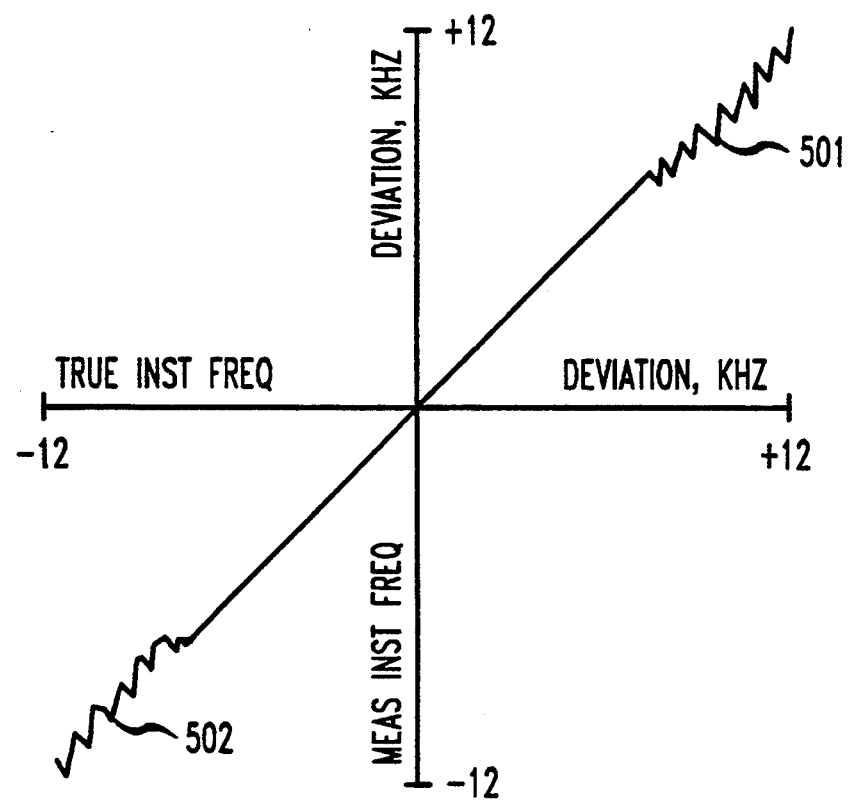
FIG. 5 is a graph of FM detector nonlinearities produced by the window function sidelobes.

The graph of FIG. 5 demonstrates the rational for the second condition restricting the window sidelobes. As the FM carrier deviates in frequency in response to the modulating signal, large deviations may cause power spectra to fall in the sidelobe structure of the Fourier transformed window. If the frequency sidelobes of the window function are too high, the derived instantaneous carrier frequency may be in significant error. The error will appear as a noise like ripple 501 and 502 such as is shown in the FIG. 5. The fine structure of this noise like ripple 501 and 502 is a function of the modulating waveform and the sidelobe structure of the window. In the case of the existing STANDARD, applicable to cellular radiotelephone systems, the first sidelobe must be maintained at least 65 dB down in order to achieve acceptable selectivity between adjacent channels as illustrated in FIG. 3. This sidelobe level is more than adequate to satisfy the second condition.

To further achieve a high degree of post detection linearity, the third condition requires that the first moment calculation be in accord with Carson's rule which specifies the minimum bandwidth needed for satisfactory FM transmission.

The linearity errors treated by conditions one, two and three are partially correlated within the measured instantaneous frequency obtained in the first moment calculation. To achieve enhanced linearity, the partial correlation property can be exploited by means of an error compensation method. The instantaneous frequency estimated error as a function of the measured instantaneous frequency can be obtained under typical modulation conditions. The estimated error can be stored in a DSP table and used to partially correct the measured values.

To achieve a high degree of FM detection sensitivity, the fourth condition restricts the use of power spectra that fall beyond the minimum bandwidth established by Carson's rule. For enhanced detection sensitivity, excessively noisy power spectra that fall within this minimum bandwidth are dynamically excluded from the first moment calculations by means of a multipass power masking process. The rationale for the fourth condition and a description of the power masking process is provided in the specification herein below accompanied by FIGS. 6 through 11 inclusive.

Figure 6:
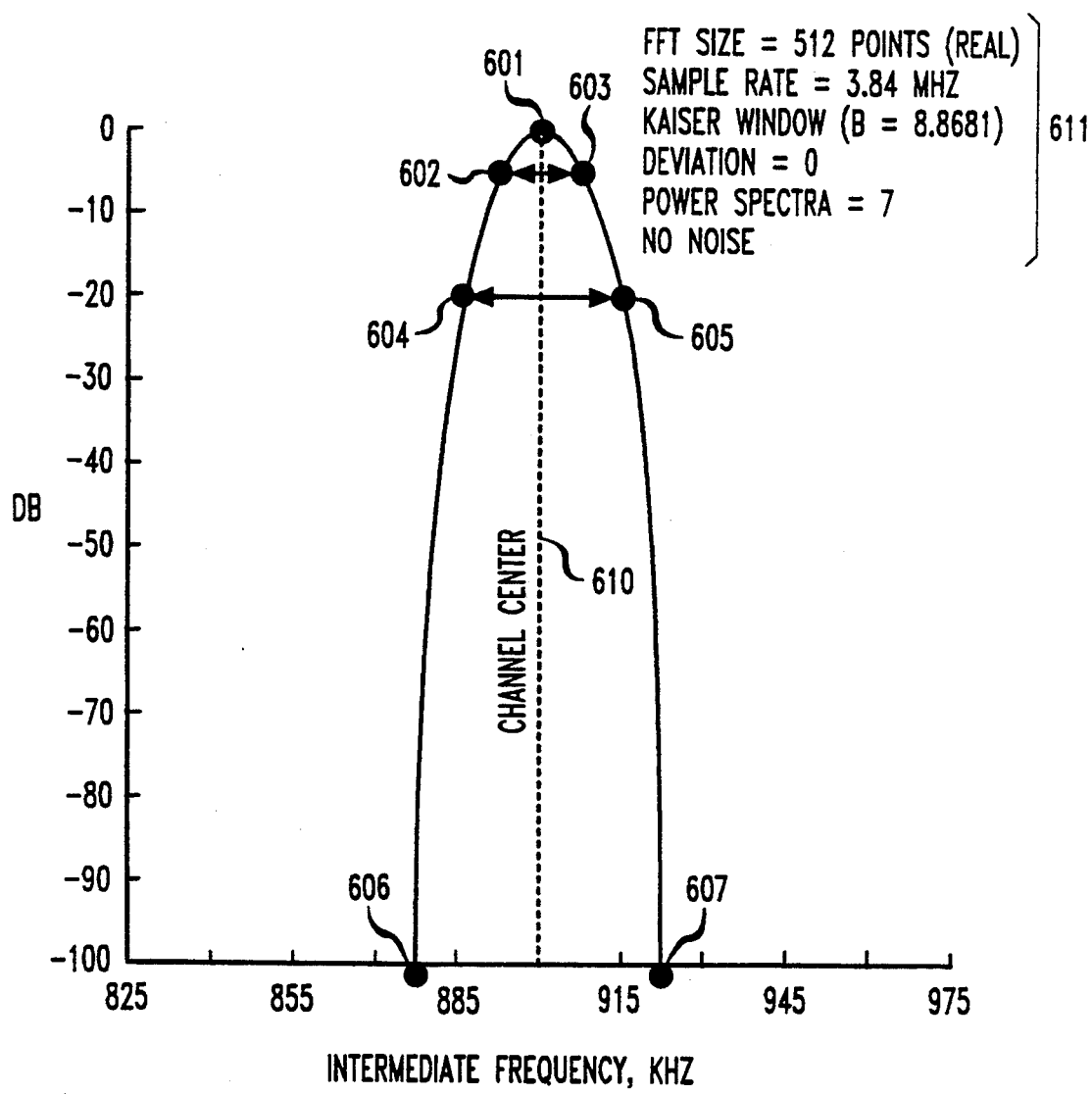
FIG. 6 is a graph of the power spectra of the unmodulated FM carrier of a typical channel.

The power spectra for a 30 KHz channel centered at an IF of 900 KHz is shown graphically in FIG. 6 for the measurement conditions specified 611. Seven power spectra, 601–607, are associated with the channel. These spectra, 601–607, are spaced 7.5 KHz apart and are symmetrical about the channel center frequency 610. This graph applies to an unmodulated FM carrier. Five of the spectra, 601–605, fall on main lobe 609 of the Fourier transformed window while two of the spectra points, 606–607, fall at the first null points. In the case of FIG. 6 the estimate of the instantaneous frequency is substantially exact. Condition four is, however, violated by the two spectra, 606–607, in FIG. 6 that are placed 7.5 KHz outside the channel boundary. The effect of these two spectra 606–607, on FM detection sensitivity and linearity is subsequently described herein below.

Figure 7:
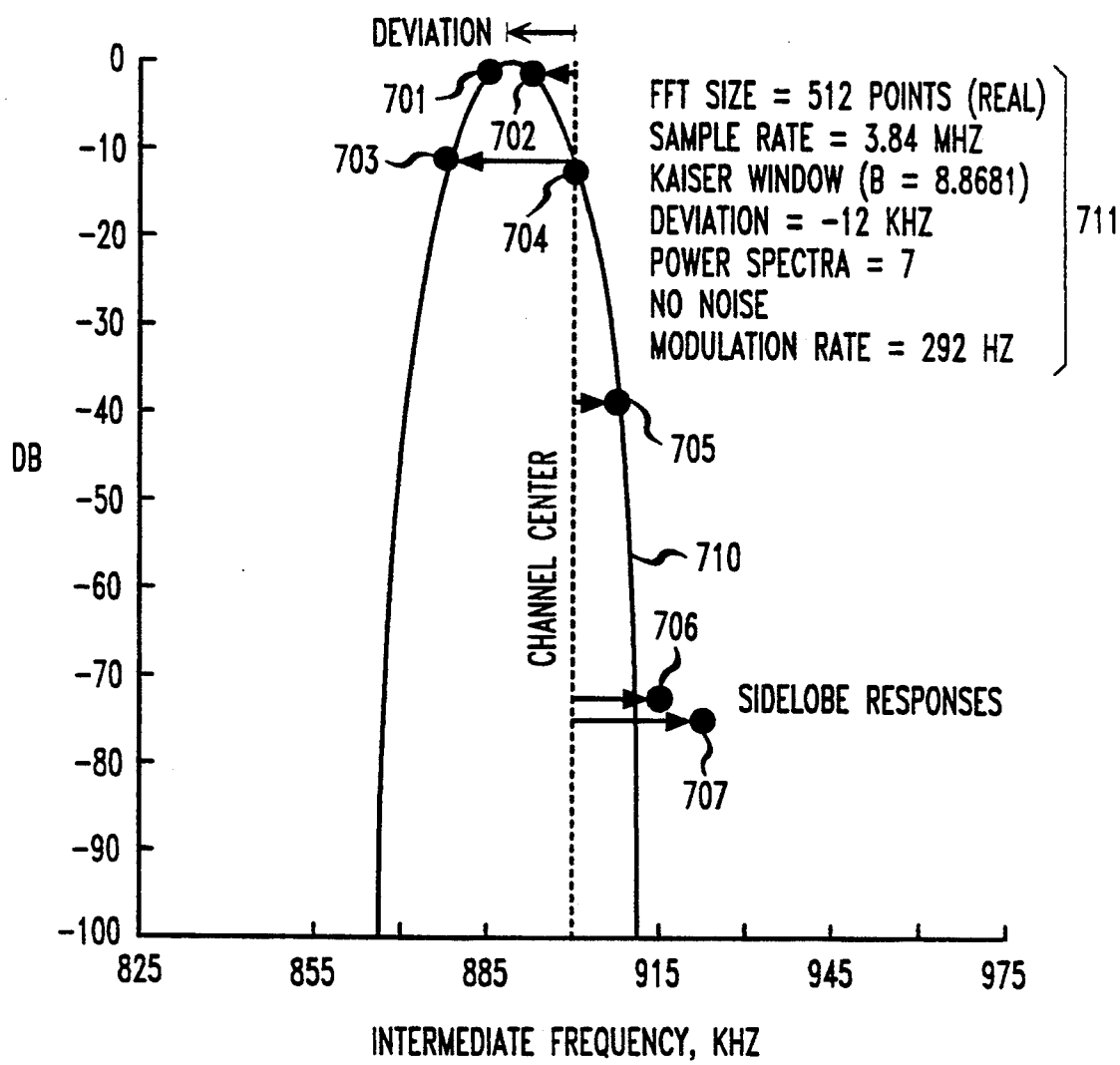
FIG. 7 is a graph of the power spectra of the modulated FM carrier of a typical channel.

FIG. 7 illustrates the same measurement conditions 711 shown in FIG. 6 except that the FM carrier is modulated at a low rate and the instantaneous frequency is shifted to a point 12 KHz below the center frequency. As before the power spectra 701–707 are fixed in frequency, but now the points have shifted along the Fourier transform of the window as it follows the movement of the modulated FM carrier. Two of the spectra, 706–707, in FIG. 7, shift into the window sidelobe structure but the error is negligible because the sidelobes are very low as specified under condition two. However, the first moment calculation does exhibit a slight error because the number of spectra, 701–707, associated with the channel have been limited to seven. Hence the first moment calculation of the instantaneous frequency will be slightly higher than the actual instantaneous frequency, but this error is so slight that the modulated signal may be substantially recovered.

Figure 8:
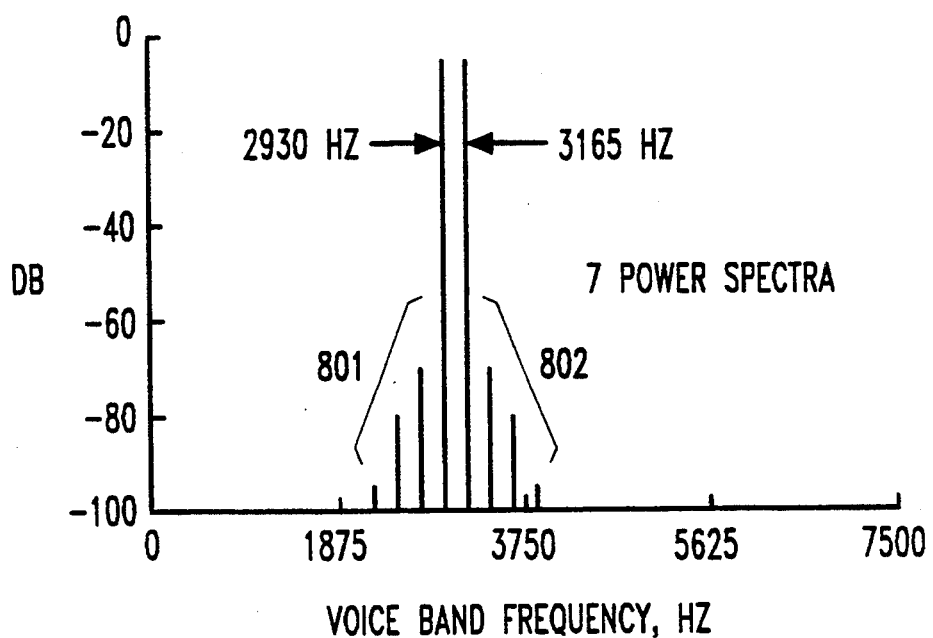
FIG. 8 is a graph of two tone post detection intermodulation products using seven power spectra per channel.
Figure 9:
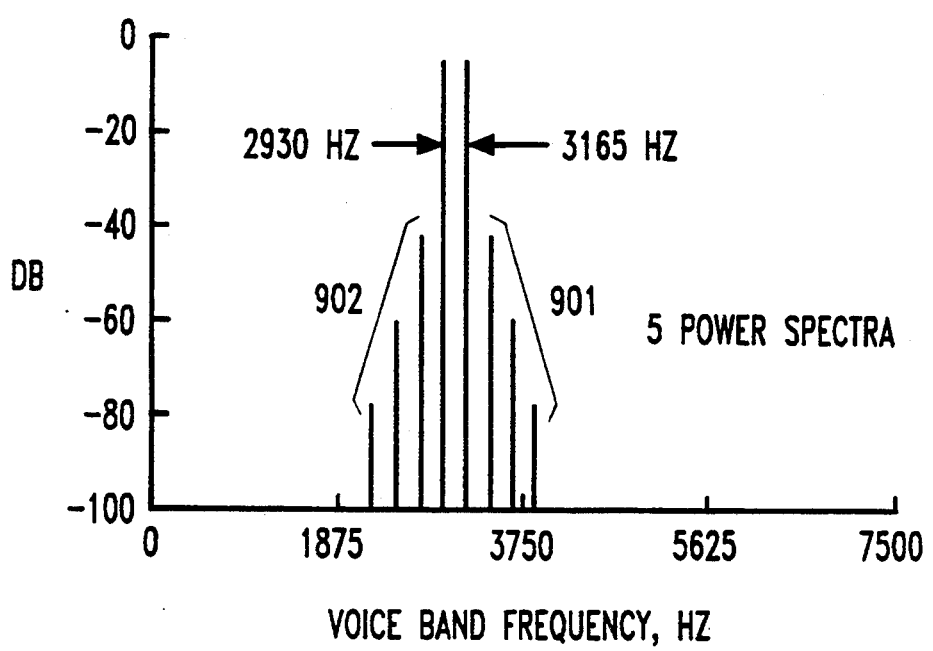
FIG. 9 is a graph of two tone post detection intermodulation products using five power spectra per channel.
Figure 10:
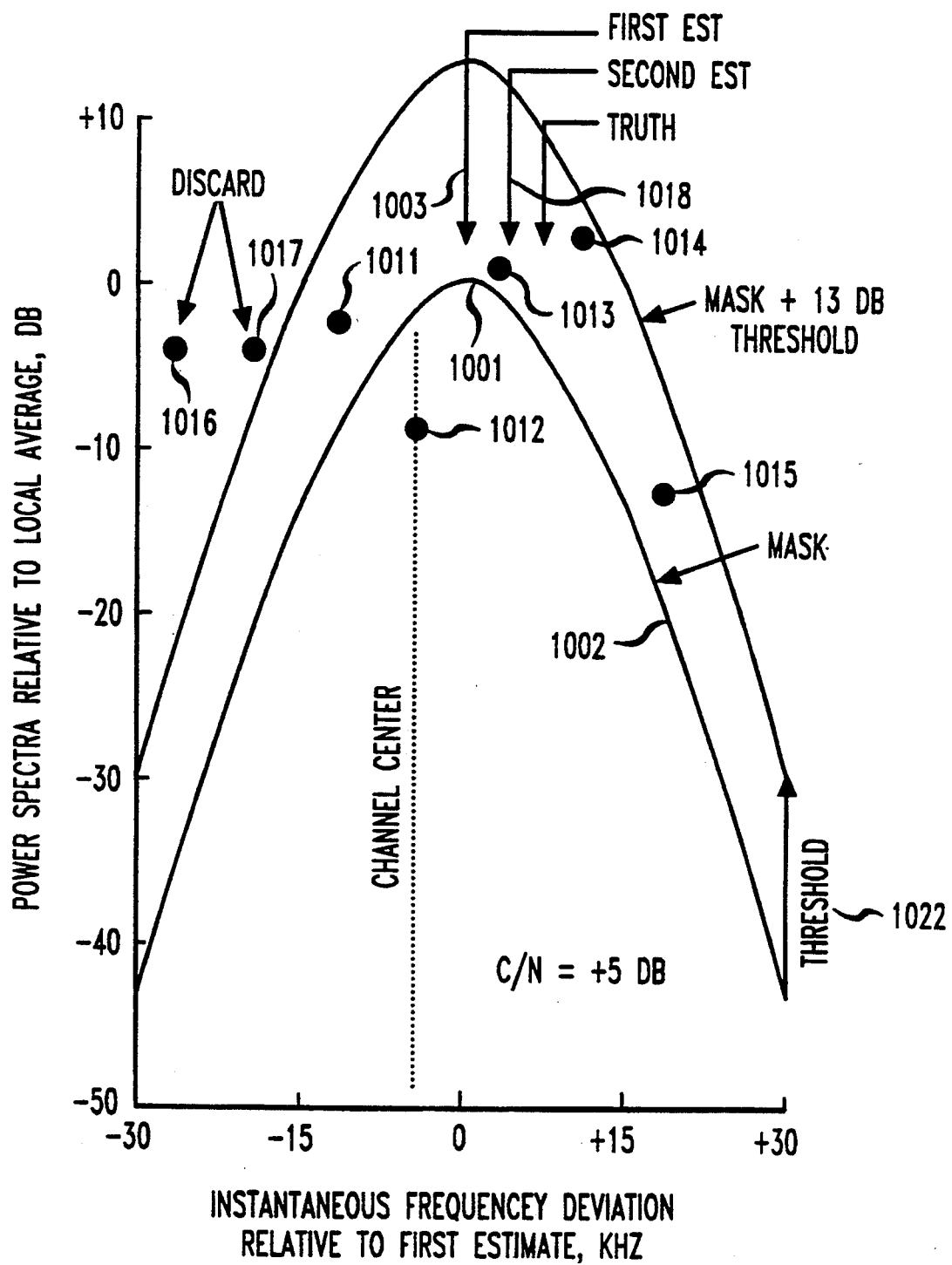
FIG. 10 is a graph of a multiple pass FM detection power mask.

The relationship between the FM detection linearity and the use of spectra beyond the FM carrier peak frequency deviation is shown graphically in the FIGS. 8 and 9 representing in both figures intermodulation products, 801, 802, and 901, 902, resulting from a two tone test. In both FIGS. 8 and 9 the test conditions are in compliance with the first, second and third conditions and with the conditions specified 803 in FIG. 8. FIG. 9 is in compliance with condition four, while FIG. 8 is not. FIG. 8 shows two voice band tones and associated intermodulation products using seven power spectra and FIG. 9 shows the voice band response using five power spectra. It is readily apparent from comparison of these graphs that the FM detection linearity is highly sensitive to the use of power spectra at or beyond the channel edges in accordance with condition three. It is also apparent from FIG. 9, that when five power spectra are used in compliance with all four of the conditions, acceptable telecommunications quality linearity will be achieved.

As indicated herein above, with respect to the fourth condition, the first moment calculation can be repeated to constitute a multi-pass operation. A single pass operation is operative, but only when full FM detection sensitivity is not required. In situations requiring a higher degree of sensitivity, the first moment calculation is repeated one or more times. In the multiple pass operation the power spectra are dynamically tested to determine if they are excessively corrupted by noise or interference. If such is the case they are excluded from first moment calculations.

The first pass FM detection process produces an estimate of the FM carrier instantaneous frequency based on the first moment of the power spectra associated with the channel. If no additional passes are performed this first pass estimate becomes the final estimate.

For performing additional passes, a power spectra mask is generated based on the instantaneous carrier frequency estimate of the previous pass and the local mean power of the spectra located adjacent in frequency to the previous estimate.

For a very low baseband modulation frequency or very low frequency deviation conditions, the power spectra will fall on the main lobe contour 710 or in the sidelobe region as shown in the FIG. 7. This contour 710 is the Fourier transform of the window function. Under differing modulation conditions the contour 710 may be spread in width, but will continue to follow the movement of the FM carrier is accordance with the amplitude of the modulating waveform.

This contour 710 can be simulated under maximum width or spreading conditions in a noise free environment. These conditions include (1) the modulating waveform is a sinewave that produces the maximum allowed peak frequency deviation, (2) the modulating waveform is a sinewave with frequency at the maximum value permitted for those signals that produce the maximum allowed peak frequency deviation, and (3) the FM carrier is experiencing its maximum rate of change of frequency. For a sinewave modulating signal the maximum rate of change occurs at zero crossings of the sinewave.

Under the STANDARD the peak frequency deviation is +/−12 KHz and maximum voice band frequency is 3 KHz. A parabolic-like mask 1002 in conformity with the preceding conditions is illustrated in the FIG. 10. In the illustrative example of FIG. 10 the maximum value 1001 of the power mask 1002 is centered on the estimate 1003 of the instantaneous frequency obtained from the previous pass, and the average power of the spectra located adjacent to the estimate of the instantaneous frequency obtained from the previous pass. Four spectra, 1011–1014, are used to obtain the average power and seven spectra, 1011–1017, are associated with the channel. In the illustrative example the FM carrier to noise ratio is +5 dB; the signal is highly corrupted by noise.

An empirically derived threshold 1022 is established above the mask 1002 and individual spectra, 1016 and 1017, exceeding this value are rejected in recalculations of the first moment. In the illustrative example of FIG. 10, this threshold 1022 is set 13 dB above the mask 1002 in order to counter the effect of noise corruption of the mask position and to assure that rejected spectra, 1016 and 1017, are significantly corrupted by noise. The two highly corrupted spectra, 1016 and 1017, located at and just below the lower edge of the channel are rejected and do not bias the second pass first moment calculation. Hence the estimate of the FM carrier instantaneous frequency increases in accuracy at designated point 1018 and the FM detection process is now considerably more sensitive.

Figure 11:
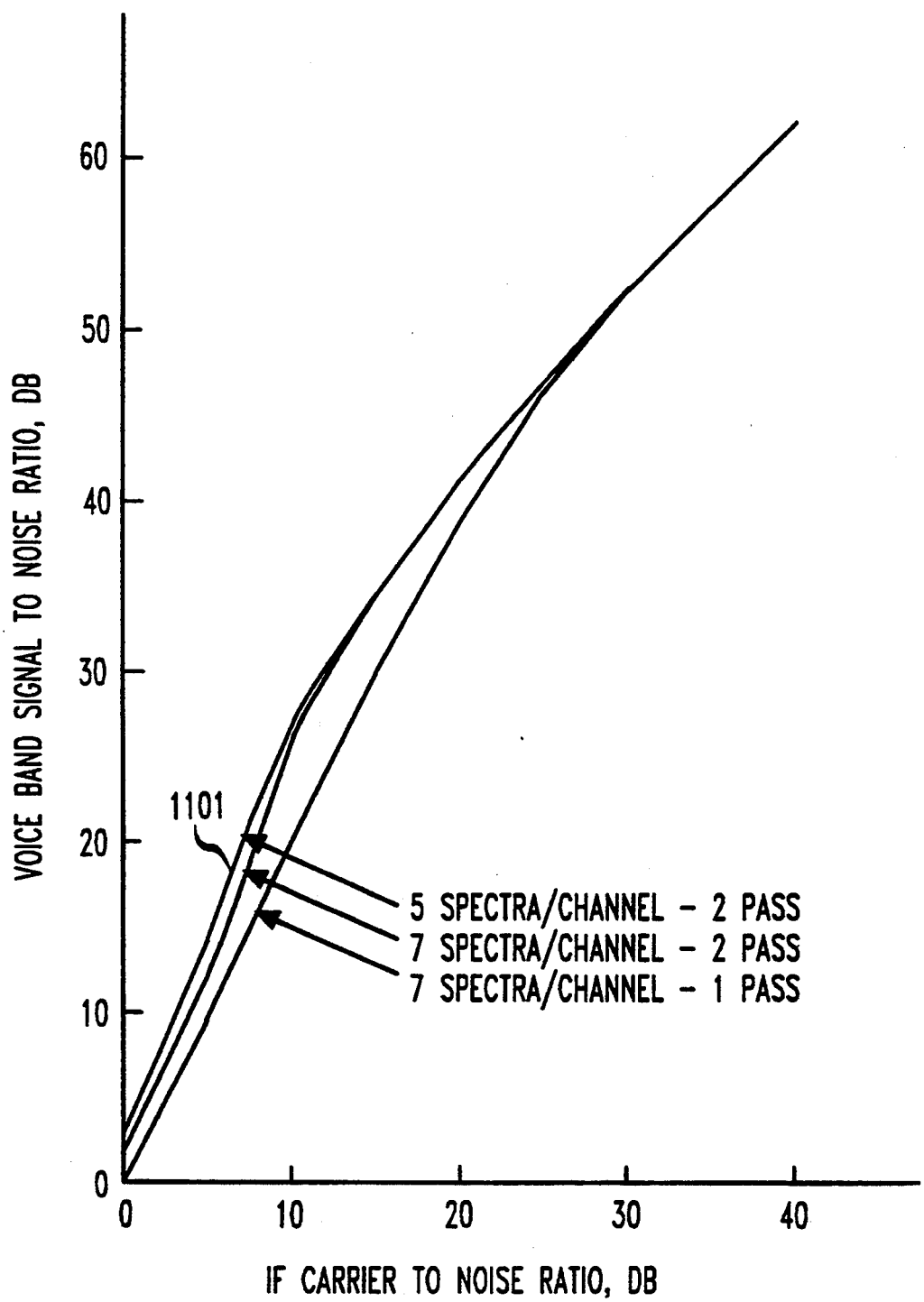
FIG. 11 is a graph of single and multipass FM detector sensitivity.

A typical voice band signal to noise ratio (S/N) versus IF carrier to noise ratio (C/N) characteristic is shown in the graph of FIG. 11, for conditions corresponding to the STANDARD. In the seven spectra per channel example the two pass FM detection process is 5 dB more sensitive than the one pass process at C/N=10 dB. The use of two passes and five spectra, in compliance with all four conditions, results in the most sensitive FM detection process characteristic 1101 illustrated.

Figure 12:
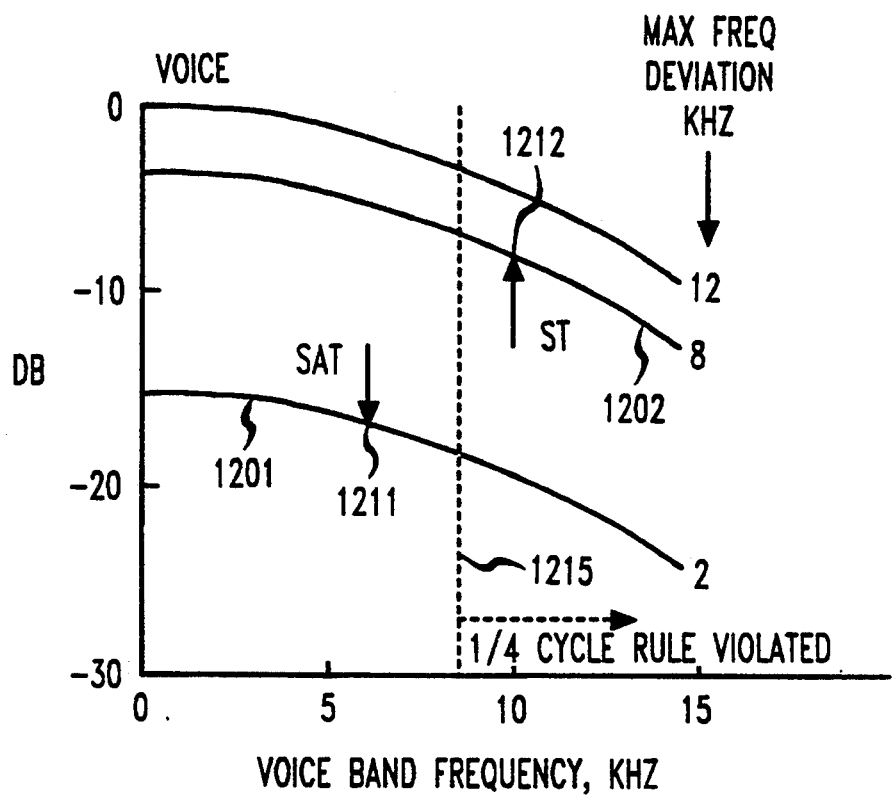
FIG. 12 is a graph of the voice band post detection amplitude response.

Post detection amplitude response, as a function voice band modulation frequency, is illustrated in the graph of FIG. 12. The response characteristics for the SAT and ST signals used in the STANDARD are shown by points, 1211 and 1212, on the curves, 1201 and 1202, corresponding to peak FM deviations at 2 KHz and 8 KHz, respectively.

The amplitude roll off of FIG. 12 is caused by the same compression effects described under conditions one, two and three. The compression is a source of non-linearity, but it also affects the amplitude of the fundamental modulating frequency. As shown in FIG. 12, the effect of condition one is the dominant source of compression and amplitude roll off above a baseband modulation frequency of approximately 3 KHz. Above the 8.5 KHz threshold 1215, the ¼ cycle rule of condition one is violated; the amplitude response is approximately 3 dB down at this frequency. The indicated measurement conditions 1205 apply to FIG. 12.

The baseband sampling rate is established by the FFT execution rate. This rate is determined by the Nyquist sampling criterion and must be high enough to avoid aliasing of the baseband modulating signal. Under the STANDARD, Manchester encoded blank and burst FSK data messages are sent from the mobile to the block receiver. These messages have a symbol width of 50 microseconds and at least one baseband sample is required per symbol for proper decoding. If the channel sample time is phase locked to the symbol phase, an FFT execution rate of 20 KHz is satisfactory. However since the individual mobiles transmit asynchronously with respect to each other, a sampling rate of at least 30 KHz is required and the FFT execution rate must satisfy this requirement.

While the FFT must operate for all the diversity paths only the selected path must be processed at the full execution rate required to decode the Manchester encoded data messages. For non-selected diversity paths, the FFT execution rate must only satisfy the need to measure receive signal strength amplitude or quality at a rate consistent with airwave telecommunication system fading statistics. For the STANDARD a non-selected diversity path FFT execution rate of less than 5 KHz is adequate and the FFT processing load can be sized accordingly.

Figure 15:
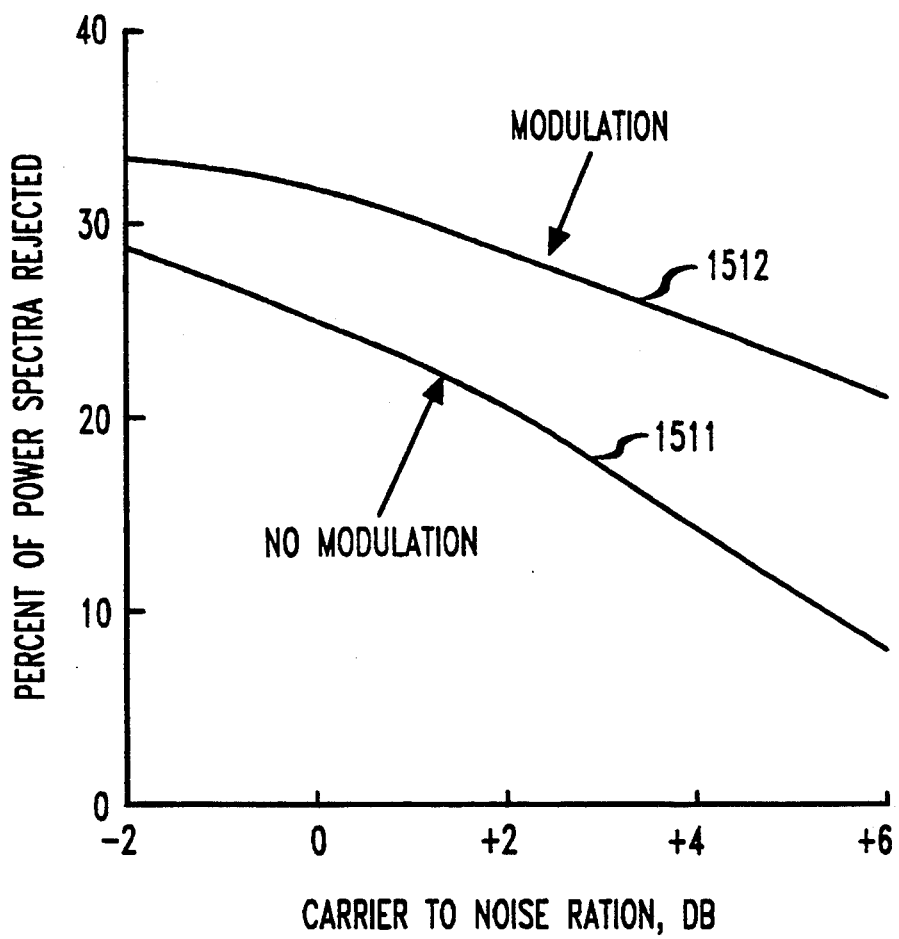
FIG. 15 is a diagram showing the relationship between spectra rejected by the FM detection power mask and channel C/N.

The STANDARD uses receive signal strength as the basis for diversity path selection. However, with multipass FM detection, a channel quality measurement can be established based on the percentage of spectra rejected by the power mask. Rejection statistics can be used to estimate the channel C/N characteristics as shown in FIG. 15 for the measurement conditions 1501 indicated.

In this figure, the power mask rejection statistics for a threshold of +7 dB are shown for the two modulation conditions that bound the accuracy of the C/N estimate. At a given C/N, rejected spectra are minimized, as per characteristic 1511, for an unmodulated FM carrier. Rejected spectra, as per characteristic 1512, are maximized when the FM carrier is modulated at the highest modulation frequency that produces the maximum allowed peak deviation and at an amplitude that produces the peak deviation. For the conditions of FIG. 15 the C/N can be estimated to an accuracy of approximately +/−2 dB in the low C/N region of interest.

The measure of channel quality can be used as the basis for selecting the best diversity path based on the most favorable C/N ratio rather than carrier strength alone. This method will result in better diversity selection performance under co-channel or adjacent channel interference conditions and will create a new parameter to assist in cellular mobile handoff decisions.

Figure 16:
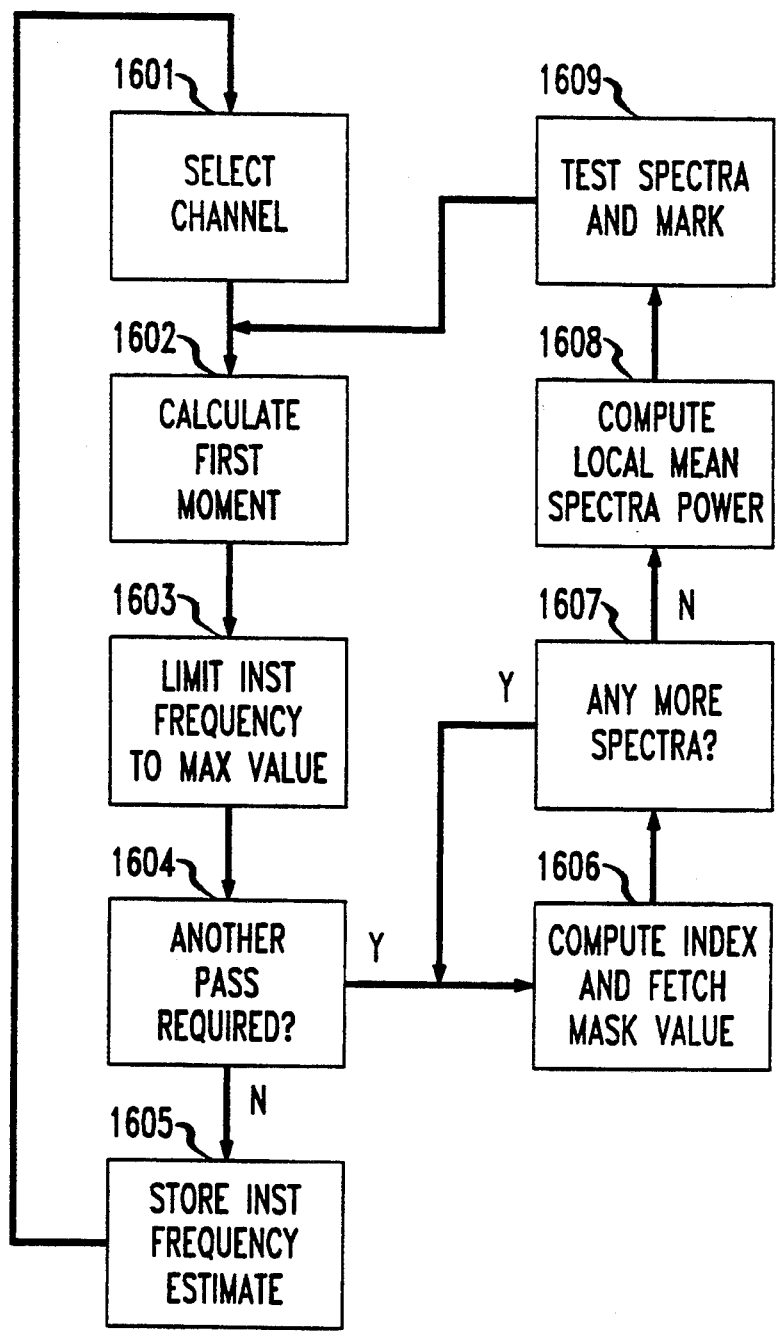
FIG. 16 is a flow diagram showing the method for the multipass FM detection process.

In addition, the measurement of channel C/N in the selected diversity path can be used to mitigate the interference or impulsive noise that is heard during multipath propagation induced Rayleigh fading conditions. The use of estimated C/N is beneficial when the FM carrier drops to a level near or below the level of channel noise or interference. For Rayleigh fades that do not fall as far as the noise or interference floor, impulsive noise may be induced as the result of a 180 degree phase rotation that typically occurs at the cusp or null of the fade. The 180 degree phase rotation produces impulsive noise with a magnitude that is highly correlated with the first derivative of the FM carrier amplitude. The instantaneous carrier amplitude is measured at the FFT execution rate as a pan of the multipass FM detection process 1608 (as shown in FIG. 16). A combination of spectra rejection statistics and carrier amplitude first derivative measurements can be used to identify when impulsive noise is present and therefore when mitigation methods should be applied. Mitigation can consist of a full or partial muting during the normally brief periods when interference or impulsive noise is present. As an alternative to muting, a low level of subjectively pleasing white background noise may be inserted during the critical pan of the fade.

The equation for computing the first moment of the windowed FFT power spectra is;

$$\text{INST FREQ EST} = \frac{\sum_{k=1}^{k=N} (F_o + \text{OFFSET}_k) P_k}{\sum_{k=1}^{k=N} P_k}$$

WHERE $$P_k = I_k^2 + Q_k^2$$

and where:

k is an index number for individual spectra;

N is the total number of power spectra associated with a specific channel;

$P_k$ is a specific power spectra $I_k$ is a real component of the Fourier coefficient;

$Q_k$ is the imaginary component of the Fourier coefficient;

$F_0$ is the reference frequency for the first moment calculation;

$\text{Offset}_k$ is the difference between the frequency of $P_k$ and $F_0$.

In general the process of the first moment calculation is encompassed by the following process steps. (1) Initially form all the $P_k = I^2_k + Q^2_k$ values for k=1 to N. This requires 2N multiples and N adds. (2) Form all $F_0 + \text{Offset}_k$ values for k=1 to N. This requires N adds and subtracts. (3) Form all $(F_0 + \text{Offset}_k) P_k$ values for k=1 to N. This requires N multiples. (4) Form the dividend summation. This requires N−1 adds or subtracts. (5) Form the divisor summation. This requires N−1 adds. (6) Form the quotient using 1 divide. These processes comprise 4N−2 adds or subtracts, 3N multiples and one division.

Figure 13:
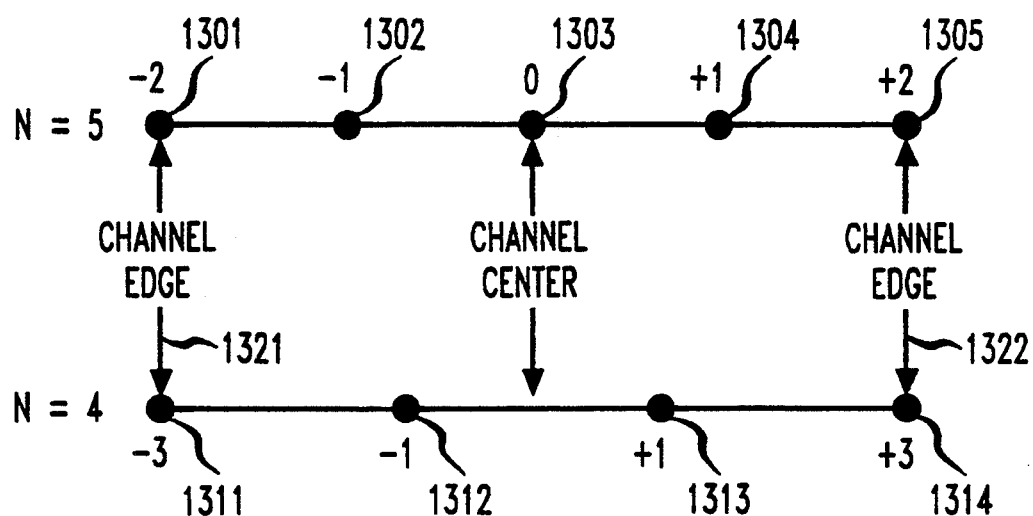
FIG. 13 is a diagram showing special case positioning of power spectra in relation to the channel boundaries for two illustrative embodiments.

In order to enhance the process efficiency of the first moment calculation the selected power spectra, 1301–1305, or 1311–1314, may be specially placed with respect to the channel edge frequency boundaries 1321 and 1322. The power spectra, as shown in the diagram of FIG. 13, are evenly spaced and placed symmetrically with respect to the center frequency of the channel. If N is odd a power spectra 1303 is placed at the channel center frequency 1323. In addition, the power spectra placement relative to the channel boundaries is the same for all channels of interest in the received block signal.

For the STANDARD, channels are of equal width and all channel frequency centers are evenly spaced from one another. The FFT produces evenly spaced power spectra; the desired spectra spacing is established by the ratio of the Analog-to-Digital sample rate to the FFT size in points. The placement of power spectra that is the same for all channels is accomplished for these conditions if the ratio of channel center spacing to power spectra spacing is an integer. The placement of power spectra symmetrically with respect to the channel center is accomplished under the preceding conditions by selecting a block receiver IF such that any channel center 1323 coincides with a power spectra 1303 (N odd) or is exactly between two spectra, 1312 and 1313, (N even).

The first moment calculation computational efficiency is significantly enhanced for the preceding arrangement of spectra and channels. The calculation process comprises the steps of; (1) Form all $P_k = I^2_k + Q^2_k$ for k=1 to N. This requires 2N multiplies and N adds. (2) Because the power spectra are uniformly spaced in frequency, the $F_0 + \text{Offset}_k$ terms need not be computed. $F_0$ is set at the channel center and $F_0 + \text{Offset}_k$ is normalized by the uniform spacing to a predetermined integer. (no calculation needed for this step) (3) The $(\text{Integer}_k) P_k$ product is replaced by adds or subtracts in the next step. (4) The dividend summation is formed by adding the power spectra corresponding to normalized offsets $+/-1$ once; offsets $+/-2$ twice, offsets $+/-3$ thrice, etc. for all power spectra associated with the channel. This requires the following adds or subtracts $(N^2-5)/4$; for N odd; N>=3

$(N^2-2)/2$; for N even; N>=2

(5) Form the divisor summation. This requires N−1 adds or subtracts. and finally (6) form the quotient using 1 divide.

For N odd this totals;

$(N^2 + 8N - 9)/4$ adds or subtracts, 2N multiples and 1 divide.

For N even this totals;

$(N^2 + 4N - 4)/2$ adds or subtracts, 2N multiples and 1 divide. The advantages achieved in computational efficiency are summarized in the table of FIG. 14.

The overall methodology or flow process for the FM detection process is illustrated in the flow diagram of FIG. 16. In block 1601 the channel of interest is selected and in subsequent block 1602 the first moment calculation is performed in accord with the above description. In the block 1603 the estimation of instantaneous frequency is limited to the maximum value known to have been transmitted. The number of passes completed is compared, as per block 1604, to the number of passes required. The number required may be fixed or may adaptively be a function of the recent history of the estimated C/N as described with reference to FIG. 15. If one or more additional passes are required, the process flow proceeds to block 1606, and the required mask processing is initiated. If the number of passes required is satisfied, the instantaneous frequency is stored in memory, as per block 1605, and the next channel to be processed is selected.

For the mask processing of block 1606, an index is computed for the spectra based on the preceding estimation of the instantaneous frequency. This index is used to access a table of mask and threshold values that have been prestored in a memory device. A count of remaining spectra is maintained in block 1607 and instructions of 1606 are invoked repeatedly until all spectra associated with the channel have been processed. A local mean power value is computed in block 1608 for those spectra nearest the preceding estimate of the instantaneous frequency. The sum of the mask and threshold values relative to the local mean power is computed for each spectra. In block 1609, each spectra is compared with the sum of the mask and threshold values as adjusted in accord with the local mean power. Spectra are marked as accepted or rejected is accordance with this comparison in the step of block 1609. The process flow proceeds to block 1002 and the process is continued.

Following the FM detection step, the diversity path with the best quality is selected, in selection circuitry 213, based on an estimation of the carrier to noise ratio for each diversity path. The C/N is estimated from the power spectra rejection rate experienced as a pan of the multipass detection process. For purposes of establishing the highest quality diversity path, the power mask threshold need not be set at the same level as used for optimum FM detection.

Following diversity selection, the digitized time series highest quality path for channels of interest in the block is subjected to the expansion step associated with channel companding, in the expand - de- emphasis circuitry 215. The expanded signal is conventionally processed, in a detection circuit 217, to detect the individual baseband modulating signals that may be present. Voice processing, in the de-emphasis circuitry 215 and the detection circuitry 217, includes digital low pass filtering and decimation to shape the voice band amplitude response in accordance with the de-emphasis function and to remove signal and noise content above the voice band. For the STANDARD, conventional signal processing techniques are used to identify the specific SAT frequencies that may be present, and to identify the presence or absence of ST and decode Manchester encoded data messages. Because of the asynchronous characteristic of these encoded data messages, over sampling is required and interpolation of two samples that may fall within a symbol will be necessary.

The information content of decoded data messages, SAT, ST as well as digitized voice is formatted for transmission by means of a digital data link interface 219 to a control location such as a cell site or macrobase 221. The interface will be modular and capable of supporting metallic, fiber, microwave or a combination of these transmission media. For cases where the block receiver is located at a cell site or macrobase, the interface is directly established with the digital bus structure of the site.

I claim:

1. In a Frequency Division Multiple Access (FDMA) wireless radiotelephone system using FM modulated signals, a method for processing a plurality of FM information signals occurring in substantially adjacent frequency defined channels;
comprising the steps of:
receiving a block of receive channels as a plurality of analog RF signals to be processed;
converting the plurality of analog RF signals into a digitized time series;
windowing the digitized time series into a plurality of defined frequency ranges equal to the number of defined channels; including:
defining a window time span having an effective time duration less than a time duration of ¼ cycle of a present baseband modulating frequency, and
restricting frequency domain sidelobes produced by windowing to a value less than a minimum acceptable post detection signal to noise ratio,
generating Fourier coefficients with fast Fourier transforms in response to the windowing in order to identify the information signals of the individual channels of the digitized time series by recovering from the Fourier coefficients instantaneous frequencies from each FM carrier in each individual frequency defined channel; including:
performing at least a first moment calculation that incorporates power spectra offset from a channel center frequency by an amount at least equal to a sum of a peak frequency deviation of FM modulation and a highest value of a modulating frequency, and
excluding from the first moment calculation power spectra offset from a channel center frequency by an amount that exceeds a sum of a peak frequency, deviation of FM modulation and a highest value of a modulating frequency,
recovering the individual voice channels from the instantaneous frequencies of each FM carrier.

2. In a Frequency Division Multiple Access (FDMA) wireless radiotelephone system using FM modulated signals, the method for processing a plurality of FM information signals occurring in substantially adjacent frequency defined channels, as claimed in claim 1:
comprising the further step of:
converting the block of RF signals into a very low frequency block IF signal by heterodyning techniques such that its low end frequency is coincident in frequency with a Fourier coefficient and its high end frequency is coincident with another Fourier coefficient and having added Fourier coefficients spaced symmetrically within the frequency range of the very low frequency block IF signal.

3. In a Frequency Division Multiple Access (FDMA) wireless radiotelephone system using FM modulated signals, the method for processing a plurality of FM information signals occurring in substantially adjacent frequency defined channels, as claimed in claim 1:
comprising the further steps of:
determining first moments of Fourier transform power spectra associated with each individual frequency defined channel,
identifying individual spectra distorted by noise and interference and
repeating the determination of first moments to generate an improved reduced noise content power spectra associated with individual frequency defined channels.

4. In a Frequency Division Multiple Access (FDMA) wireless radiotelephone system using FM modulated signals, the method for processing a plurality of FM information signals occurring in substantially adjacent frequency defined channels, as claimed in claim 1:
comprising the further step of:
limiting determination of the instantaneous frequencies of each FM carrier in each individual frequency defined channel to a FM frequency range known to have been transmitted.

5. In a Frequency Division Multiple Access (FDMA) wireless radiotelephone system using FM modulated signals, a method for processing a plurality of FM information signals occurring in substantially adjacent frequency defined channels;
comprising the steps of:
receiving a block of receive channels as a plurality of analog RF signals to be processed;
converting the plurality of analog RF signals into a very low frequency block IF signal by heterodyning techniques and further converting the block IF signal into a digitized time series;

windowing the digitized time series into a plurality of defined frequency ranges equal to the number of defined channels; including:

defining a window time span having a time duration less than a time duration of ¼ cycle of a present baseband modulating frequency, and restricting frequency domain sidelobes produced by windowing to a value less than a minimum acceptable post detection signal to noise ratio, generating Fourier coefficients with fast Fourier transforms in response to the windowing in order to identify the information signals of the individual channels of the digitized time series by recovering from the Fourier coefficients instantaneous frequencies from each FM carrier in each individual frequency defined channel; including:

performing a plurality of passes of first moment calculation that incorporate power spectra offset from a channel center frequency by an amount at least equal to a sum of a peak frequency deviation of FM modulation and a highest value of a modulating frequency to calculate an estimate of instantaneous frequency, and limiting the calculated estimate of instantaneous frequency to a maximum value known to have been transmitted;

comparing a number of passes of first moment calculation to a required number of passes of first moment calculation;

calculating a local mean power value for spectra nearest the calculated estimate of instantaneous frequency;

computing a sum mask and threshold values relative to the spectra and identifying spectra values that are acceptable;

recovering the individual voice channels from the instantaneous frequencies of each FM carrier.

6. In a Frequency Division Multiple Access (FDMA) wireless radiotelephone system using FM modulated signals, a method for processing a plurality of FM information signals occurring in substantially adjacent frequency defined channels, as claimed in claim 5;

comprising the further step of:

converting the block of RF signals into a very low frequency block IF signal by heterodyning techniques such that its low end frequency is coincident in frequency with a selected Fourier coefficient and its high end frequency is coincident with another Fourier coefficient above the selected Fourier coefficient and having added Fourier coefficients spaced symmetrically within the frequency range of the very low frequency block IF signal.

7. In a Frequency Division Multiple Access (FDMA) wireless radiotelephone system using FM modulated signals, a method for processing a plurality of FM information signals occurring in substantially adjacent frequency defined channels;

comprising the steps of:

receiving a block of receive channels as a plurality of analog RF signals to be processed;

converting the plurality of RF signals into a very low frequency block IF signal and further converting the block IF signal into a digitized time series;

windowing the digitized time series into a plurality of defined frequency ranges equal to the number of defined channels; including:

defining a window time span having a time duration less than a time duration of ¼ cycle of a present baseband modulating frequency, and restricting frequency domain sidelobes produced by windowing to a value less than a minimum acceptable post detection signal to noise ratio, generating Fourier coefficients with fast Fourier transforms in response, to the windowing in order to identify the information signals of the individual channels of the digitized time series by recovering from the Fourier coefficients instantaneous frequencies from each FM carrier in each individual frequency defined channel; including:

relating the Fourier coefficients to the channel frequencies such that its low end frequency is coincident in frequency with a selected Fourier coefficient and its high end frequency is coincident with another Fourier coefficient higher than the selected Fourier coefficient and having added Fourier coefficients spaced symmetrically within the frequency range of the very low frequency block IF signal;

performing a first moment calculation that incorporates power spectra offset from a channel center frequency by an amount at least equal to a sum of a peak frequency deviation of FM modulation and a highest value of a modulating frequency, and excluding from the first moment calculation power spectra offset from a channel center frequency by an amount that exceeds a sum of a peak frequency deviation of FM modulation and a highest value of a modulating frequency, recovering the individual voice channels from the instantaneous frequencies of each FM carrier with FM detection techniques.

8. In a Frequency Division Multiple Access (FDMA) wireless radiotelephone system using FM modulated signals, a method for processing a plurality of FM information signals occurring in substantially adjacent frequency defined channels;

comprising the steps of:

receiving a block of receive channels as a plurality of analog RF signals to be processed;

converting the plurality of analog RF signals into a very low frequency block IF signal and further converting the block IF signal into a digitized time series;

windowing the digitized time series into a plurality of defined frequency ranges equal to the number of defined channels; including:

defining a window time span having a time duration less than a time duration of ¼ cycle of a present baseband modulating frequency, and restricting frequency domain sidelobes produced by windowing to a value less than a minimum acceptable post detection signal to noise ratio, generating Fourier coefficients with fast Fourier transforms in response to the windowing in order to identify the information signals of the individual channels of the digitized time series by recovering from the Fourier coefficients instantaneous frequencies from each FM carrier in each individual frequency defined channel; including:

performing a first moment calculation that incorporates power spectra offset from a channel center frequency by an amount at least equal to a sum of a peak frequency deviation of FM modulation and a highest value of a modulating frequency to calculate an estimate of instantaneous frequency, and limiting the calculated estimate of instantaneous frequency to a maximum value known to have been transmitted;

recovering the individual voice channels from the instantaneous frequencies of each FM carrier.

9. In a Frequency Division Multiple Access (FDMA) wireless radiotelephone system using FM modulated signals, a method for processing a plurality of FM information signals occurring in substantially adjacent frequency defined channels with a high degree of linearity; comprising the steps of:

receiving a block of receive channels as a plurality of analog RF signals to be processed;

converting the plurality of analog RF signals into a very low frequency block IF signal and converting the block IF signal into a digitized time series;

windowing the digitized time series into a plurality of defined frequency ranges equal to the number of defined channels; including:

defining a window time span having a time duration less than a time duration of $\frac{1}{4}$ cycle of a present baseband modulating frequency, and restricting frequency domain sidelobes produced by windowing to a value less than a minimum acceptable post detection signal to noise ratio, generating Fourier coefficients with fast Fourier transforms in response to the windowing in order to identify the information signals of the individual channels of the digitized time series by recovering from the Fourier coefficients instantaneous frequencies from each FM carrier in each individual frequency defined channel; including:

performing at least a first moment calculation that incorporates power spectra offset from a channel center frequency by an amount at least equal to a sum of a peak frequency deviation of FM modulation and a highest value of a modulating frequency, and recovering the individual voice channels from the instantaneous frequencies of each FM carrier.

10. In a Frequency Division Multiple Access (FDMA) wireless radiotelephone system using FM modulated signals, a method for processing a plurality of FM information signals occurring in substantially adjacent frequency defined channels with a high degree of sensitivity;

comprising the steps of:

receiving a block of receive channels as a plurality of analog RF signals to be processed;

converting the plurality of analog RF signals into a very low frequency block IF signal and further converting the block IF signal into a digitized time series;

windowing the digitized time series into a plurality of defined frequency ranges equal to the number of defined channels; including:

generating Fourier coefficients with fast Fourier transforms in response to the windowing in order to identity the information signals of the individual channels of the digitized time series by recovering from the Fourier coefficients instantaneous frequencies from each FM carrier in each individual frequency defined channel; including:

performing at least a first moment calculation that incorporates power spectra offset from a channel center frequency by an amount at least equal to a sum of a peak frequency deviation of FM modulation and a highest value of a modulating frequency, and excluding from the first moment calculation power spectra offset from a channel center frequency by an amount that exceeds a sum of a peak frequency deviation of FM modulation and a highest value of a modulating frequency, recovering the individual voice channels from the instantaneous frequencies of each FM carrier.

11. A method of processing FM signals in a Frequency Division Multiple Access (FDMA) radiotelephone system; having a plurality of analog radio signals in substantially adjacent frequency defined channels;

comprising the steps of:

intercepting the plurality of analog radio signals with an antenna;

receiving the plurality of radio signals as a unitary block radio signal;

converting the block radio signal to an analog IF signal;

converting the IF signal into a digitized time series by sampling the analog IF signal;

windowing the digitized time series to improve selectivity between channels;

generating Fourier coefficients with fast Fourier transforms in response to the windowing in order to identify the information signals of the individual frequency defined channels of the digitized time series by recovering from the Fourier coefficients instantaneous frequency signals from each FM carrier in each individual frequency defined channel;

selecting a high quality diversity path based on carrier-to-noise ratio and expanding the instantaneous frequency signals;

detecting a baseband modulating information signal;

shaping the baseband modulating information signal by de-emphasis to remove noise;

formatting the baseband modulating information signal for transmission to a control location;

transmitting the signal formatted to a land telephone network.

12. A block receiver signal processing method applicable to an analog FM frequency domain multiple access (FDMA) wireless cellular radio telephone system using one FM carrier per channel and conveying a plurality of information signals occurring in substantially adjacent channels;

comprising the steps of:

receiving a block of receive channels as a plurality of analog RF signals to be processed, converting the block of analog RF signals into a block of IF signals by means of analog amplification, filtering and heterodyning methods, converting the block analog IF signal into a digitized time series by means of a high speed, high precision analog to digital converter, applying a window function to the digitized time series to produce acceptable levels of selectively, dynamic range, linearity and amplitude flatness, applying the windowed time series to a fast Fourier transform (FFT) processor to isolate, in frequency, individual channels in the block, detecting the FM signals based on a multi-pass first moment method using the FFT derived power spectra associated with each channel of interest.

applying an expansion step of a companding process and de-emphasis low pass filtering for recovery of voice signals, identifying specific supervisory audio tones (SAT) that may be present, identifying a presence of signaling tone ST and decoding Manchester encoded data messages, formatting the digitized voice, and the information content of decoded data messages, SAT and ST for transmission by means of a digital data link, transmitting the channel information by means of digital data links to a central location, and interfacing the channel information with the digital bus structure at the control site.

13. The block receiver signal processing method as claimed in claim 12,
wherein the step of detecting the FM signals is based on a multi-pass detection process,
comprises the further steps of:
generating estimates of the FM instantaneous frequency by means of a first moment calculation based on power spectra associated with the carrier frequency,
using a power mask to reject power spectra, for the purpose of subsequent first moment calculations, that are excessively corrupted by noise and interference,
limiting the estimates of instantaneous frequency to the maximum deviation known to have been transmitted.

14. In a wireless radio telephone system, apparatus connected for receiving voice and data signals in block form from a group of individual radio signals each incorporating a single FM carrier that is distinct in frequency; comprising
a receiver assembly connected for processing the group of individual radio signals in the block form and converting the radio signals to an IF frequency;
an analog-to-digital converter connected for converting the radio signal in the block form into a digital time series format;
a window function processor connected for applying a window function to the digital time series;
a fast Fourier transform processor operative and connected for isolating in frequency multiple spectra associated with each individual FM carrier in the block form;
an FM detector connected for estimating an instantaneous frequency of individual FM carrier based on the first moment of power spectra associated with the individual FM carrier and recovering voice and signal information of each FM carrier;
a detection circuit connected for recovering voice and data signals, SAT (supervisory audio tones) and manchester encoded data;
a data link interface connected for formatting the voice and data signals for digital transmission to a control and processing location.

15. In a wireless radio telephone system, as claimed in claim 14:
wherein the fast Fourier transform processor is a discrete Fourier transform processor.

16. In a wireless radio telephone system, as claimed in claim 14:
further including;
the FM detector including apparatus for identifying Fourier spectra excessively corrupted by noise by subsequent recalculations of the first moment.

17. In the wireless radio telephone system, as claimed in claim 14:
further including;
the FM detector including apparatus for exploiting a correlation between errors in estimating the instantaneous frequency of the FM carrier and a magnitude of estimated frequency to compensate for the error.

18. A signal processing arrangement for processing a plurality of FM information signals occurring in substantially adjacent frequency defined channels; comprising:
an analog processor for accepting a block composite signal containing the plurality of FM information signals from an antenna;
an analog-to-digital processor to convert the single block of RF signals into a digitized time series;
conversion circuitry for converting the block of RF signals into a very low frequency block IF signal having its low end frequency coincident in frequency with Fourier coefficient and its high end frequency coincident with another Fourier coefficient and having added Fourier coefficients spaced symmetrically within the frequency range of the very low frequency block IF signal;
digital signal processing apparatus including stored program instructions for windowing the digitized time series and generating Fourier coefficients with fast Fourier transforms to identify the individual channels of the digitized time series by recovering instantaneous frequencies from each FM carrier in each individual frequency defined channel; and
the stored instructions in digital signal processing apparatus operative to determine first moments of Fourier transform power spectra associated with each individual frequency defined channel and for identifying individual spectra distorted by noise and interference and repeating the determination of first moments to generate an improved reduced noise content associated with individual frequency defined channels;
FM detection circuitry for recovering the individual voice channels from the instantaneous frequencies of each FM carrier.

19. The signal processing arrangement for processing a plurality of FM information signals as claimed in claim 18; wherein:
the stored program instructions in the digital signal processing apparatus being operative to limit determination of the instantaneous frequencies of each FM carrier in each individual frequency defined channel known to have been transmitted.

20. In a wireless radio telephone system, signal processing apparatus for recovering individual signal channels from a group of telecommunication channels each incorporating a single FM modulated carrier per individual channel; comprising:
an analog processor for accepting a block composite signal containing the plurality of FM information signals from an antenna;
conversion circuitry for reducing the frequency of the block RF signal to a block IF signal;
an Analog-to-Digital converter for converting the block IF signal to a digitized time series;
window processing circuitry for applying a window function to the digitized time series;
a transform processor for determining Fourier coefficients in response to the signal output of the window processing circuitry in order to frequency define individual FM modulated carriers of the block IF signal and including a stored program control including instructions for determining first moments of Fourier transform power spectra associated with each individual FM modulated carrier and for identifying individual spectra distorted by noise and interference and repeating the determination of first moments to generate an improved reduced noise content power spectra associated with individual FM modulated carriers; and demodulation circuitry for recovering the FM information signals.

21. In the wireless radio telephone system, signal processing apparatus as claimed in claim 20; wherein:

the conversion circuitry being operative for converting the block of RF signals into a very low frequency block IF signal having its low end frequency coincident in frequency with a Fourier coefficient and its high end frequency coincident with another Fourier coefficient and having added Fourier coefficients spaced symmetrically within the frequency range of the very low frequency block IF signal.

22. A method for processing a plurality of FM information signals occurring in substantially adjacent frequency defined channels;

comprising the steps of:

receiving a radio signal input as a single block of a plurality of RF information signals to be processed;

converting the single block of analog RF signals into a digitized time series;

converting the single block of RF signals into a very low frequency block IF signal by heterodyning techniques such that its low end frequency is coincident in frequency with Fourier coefficient and its high end frequency is coincident with a another Fourier coefficient and having added Fourier coefficients spaced symmetrically within the frequency range of the very low frequency block IF signal;

windowing the digitized time series into a plurality of defined frequency ranges equal to the number of defined channels;

generating Fourier coefficients with fast Fourier transforms in response to the windowing in order to identity the information signals of the individual channels of the digitized time series by recovering from the Fourier coefficients instantaneous frequencies from each FM carrier in each individual frequency defined channel; and recovering individual voice channels from the instantaneous frequencies of each FM carrier;

comprising the further steps of:

determining first moments of Fourier transform power spectra associated with each individual frequency defined channel;

identifying individual spectra distorted by noise and interference; and repeating the determination of first moments generate an improved reduced noise content power spectra associated with individual frequency defined channels.

23. In a wireless radio telephone system, a method of signal processing for recovering individual signal channels from a group of telecommunication channels each incorporating a single FM modulated carrier per individual channel; comprising the steps of:

receiving a radio signal input as a single block of receive channels comprised of a plurality of analog RF signals to be processed:

reducing frequency of the plurality of RF signals and and converting to a block IF signal;

converting the block IF signal to a digitized time series;

applying a window function to the digitized time series and deriving a window for each channel of the IF block signal;

applying fast Fourier transform (FFT) processing to the digitized time series for determining Fourier coefficients for each individual window in order to define an instantaneous frequency for individual FM modulated carriers of the block IF signal;

recovering the individual signal channels from the Fourier coefficients by;

determining first moments of Fourier transform power spectra associated with each individual FM modulated carrier;

identifying individual spectra distorted by noise and interference; and repeating the determination of first moments to generate an improved reduced noise content power spectra associated with individual FM modulated carriers.

* * * * *